United States Patent [19]
Huber

[11] Patent Number: 6,086,201
[45] Date of Patent: Jul. 11, 2000

[54] SPECTACLE MOUNT WITH A LOCKING BLOCK-SCREW CONNECTION SECURED AGAINST LOOSENING

[75] Inventor: Ulrich Huber, Rathenow, Germany

[73] Assignee: Huma GmbH, Feinwerktechnische, Rathenow, Germany

[21] Appl. No.: 09/155,623

[22] PCT Filed: Apr. 2, 1997

[86] PCT No.: PCT/DE97/00731

§ 371 Date: Sep. 30, 1998

§ 102(e) Date: Sep. 30, 1998

[87] PCT Pub. No.: WO97/37268

PCT Pub. Date: Oct. 9, 1997

[30] Foreign Application Priority Data

Apr. 2, 1996 [DE] Germany .......................... 196 14 761

[51] Int. Cl.[7] .................................................. G02C 5/00
[52] U.S. Cl. .......................... 351/141; 351/140; 351/153
[58] Field of Search ..................................... 351/153, 141, 351/121, 90–102, 41, 140; 16/228

[56] References Cited

U.S. PATENT DOCUMENTS 3,546,735 12/1970 Liautaud .................. 351/153

*Primary Examiner*—Hung Xuan Dang
*Attorney, Agent, or Firm*—Cohen, Pontani, Lieberman & Pavane

[57] ABSTRACT

A locking block screw connection provides material-elastic protection against loosening of the screw by a novel configuration of the connection zone, where a bore and a screw are engaged. The bore is provided with a circular taper at the thread runout. The screw has a pin continuation where an annular groove is provided. When the screw is screwed into the bore, the taper of the bore is elastically deformed until the taper engages in the groove of the screw. The engagement between the taper and the groove provides an axial security against loosening of the screw.

5 Claims, 2 Drawing Sheets

SPECTACLE MOUNT WITH A LOCKING BLOCK-SCREW CONNECTION SECURED AGAINST LOOSENING

BACKGROUND OF THE INVENTION

1. Field of the Invention

The invention is directed to a locking block screw connection for spectacle mounts.

2. Description of the Prior Art

Different construction forms are known for the problem of preventing the loosening of screws. For example, it has been attempted to increase protection against the loosening of screws by means of clamping in that knurling is arranged on the screw head or screw shank area. Variants of this kind do not achieve the required security, since the screws are not secured axially and can therefore loosen. Further, constructions are known in which plastic is injected around the head area or shank area of the screw in order to increase security. However, these variants cannot absorb rotational loosening forces and do not achieve genuine protection against loosening because of the inferior material strength of plastic, so that full protection is not realized in these variants.

Other variants are constructed with additional clamping sleeves, etc., but do not offer complete protection against loosening of the screw and can be produced only by considerable extra expenditure.

In a construction according to DE 37 37 126, improved security against loosening of the screw connection is achieved in that a collar is arranged at the screw head and in that material is pressed into this collar by plastic deformation. In proportion, however, enormously high plastic deforming forces and area friction forces act on the connection in this case, so that deformations can occur at the thread when screwing in as a result of high flank loading. The use of a securing connection brought about in a plastic manner cannot therefore achieve success in terms of function for metal materials.

In a construction according to EP 393244, increased protection against loosening by plastic clamping is achieved only in the conical screw head zone. The screw is not fully secured against loosening because the rotational loosening forces act on the screw and this screw can therefore loosen due to the absence of any real axial securing.

WO 95/32 448, FIGS. 2 and 3, discloses a screw protection for the frame connection in which the screw 2 has a continuation piece having a constant diameter before the screw thread in the screw direction, wherein an annular groove 7 is introduced in the continuation piece and a Seeger ring or snap ring 8 can be inserted into this annular groove 7 after the screw is screwed in.

The frame parts 1a, 1b are elastically supported relative to one another by a spring 5, 10. This construction has a relatively large number of structural component parts and, for technical reasons, requires the use of a Seeger ring or snap ring.

In U.S. Pat. No. 5,488,440, the screw for connecting the frame parts is secured in that the internal thread for receiving the screw is initially compressed elastically to the required diameter by screwing in and a clamping action is accordingly exerted on the screw.

In this connection, at least when the connection is used as a hinge connection, a constant position of the screw, i.e., the movability of the hinge, is not guaranteed.

SUMMARY OF THE INVENTION

One object of the invention is to provide a locking block screw connection which ensures full protection against loosening of the screw in such a way that the functioning capacity of the connection is not impaired and the cost of commercial production of the connection for spectacle frame parts is not increased.

Pursuant to this object, and others which will become apparent hereafter, the present invention provides a spectacle mount with a locking block screw connection, which comprises two locking blocks and a screw. The locking blocks have a bore extending through them, which has a tapered portion—a circular taper, while the screw has a pin continuation which defines an annular groove corresponding to the circular taper. When the screw is inserted into the locking block bore, the tapered portion of the bore is elastically deformed to allow the passage of the pin continuation until the tapered portion engages in the groove on the pin continuation. The engagement between the taper and the groove provides an axial security against loosening of the screw from the bore.

More specifically, during assembly, the tapered portion is elastically displaced by the pin at the screw tip when tightening the screw and projects into the annular groove of the screw. This results in a genuine axial securing of the screw connection which can absorb the rotational loosening forces on the screw.

This provides complete protection against loosening of the screw while maintaining the proper functional capability of the connection with respect to manufacture and assembly. The elastic deformation does not result in a permanent deformation of material, and the connection remains functional after repeated loosening of the screw, which constitutes an important processing feature of mount parts of this type.

Further details relating to the securing arrangement, according to the invention, for a screw for spectacle mounts with a locking block are shown in FIGS. 1 to 4 of the drawing and are described hereinafter.

DETAILED DESCRIPTION OF THE PREFERRED EMBODIMENT

Figure 1:
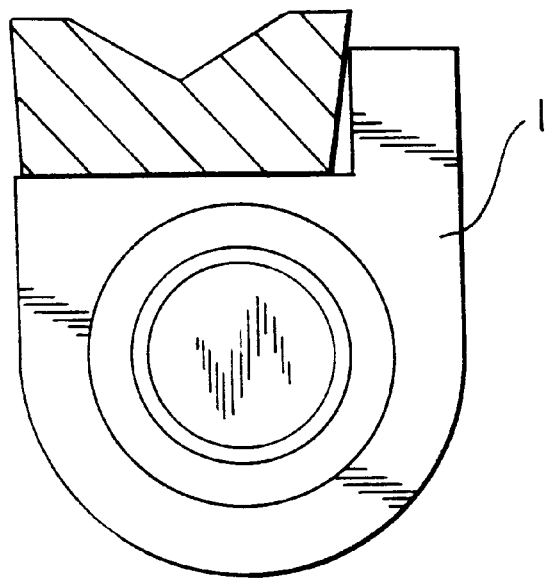
FIG. 1 shows a top view of the new locking block.
Figure 2:
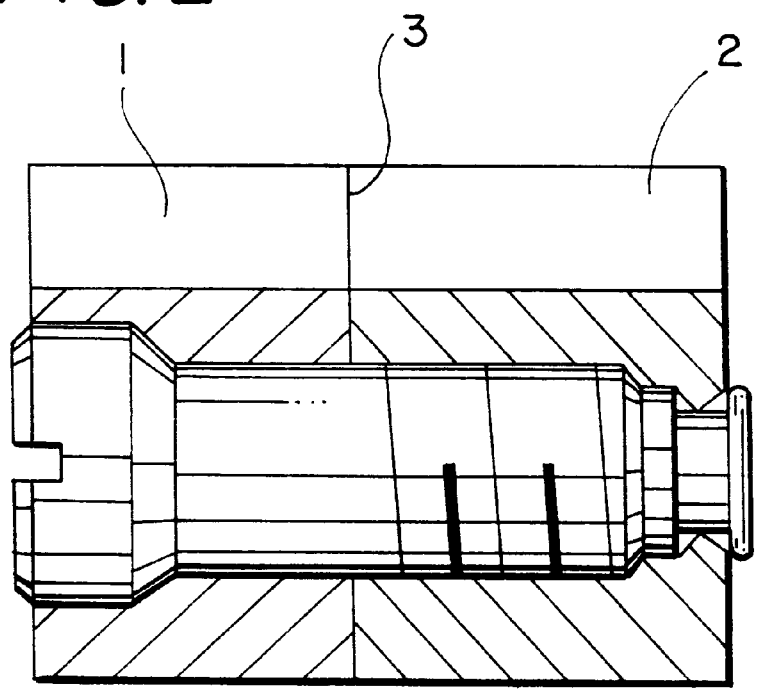
FIG. 2 shows a cross section through the locking block with screw.
Figure 3:
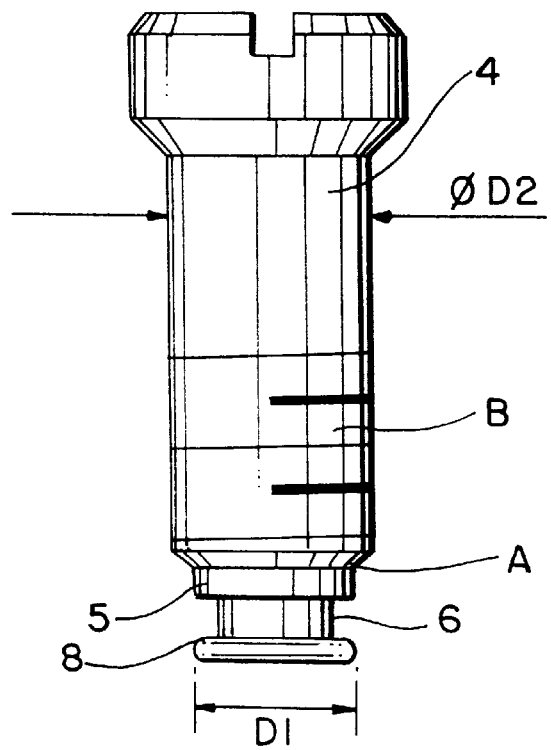
FIG. 3 shows a side view of the screw.

As can be seen from the drawing, the locking block is divided into two parts 1 and 2 at dividing line 3 (FIG. 2). Following the threaded pin area B, the screw 4 has a pin continuation 5 with annular groove 6 and transition area A (FIG. 3). The screw is preferably arranged in such a way that the diameter of the threaded pin D2 is greater than the diameter of the continuation pin D1, so that the pin can be freely inserted into the locking block. The pin is a novel extension of the conventional screw and is preferably rounded at the pin head 8.

Figure 4:
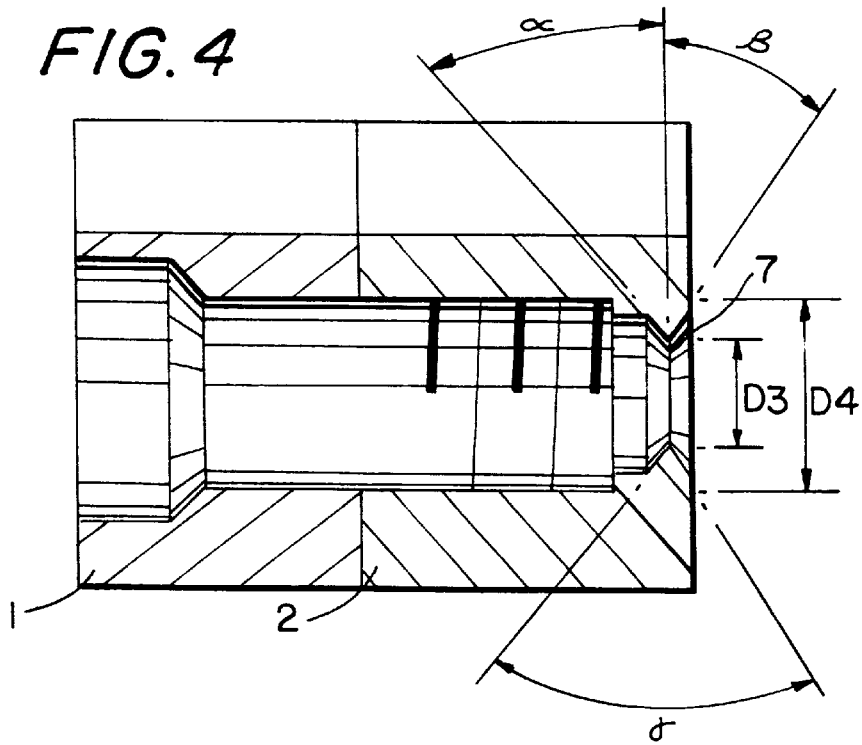
FIG. 4 shows a cross section through the locking block without screw.

The locking block bore has a circular taper 7, preferably with an acute angle a formed by the sum of angles α and β (FIG. 4). The taper forms the bore opening at the locking block and extends at an acute angle σ to the center axis of the bore. The taper reaches a diameter D3 which is smaller than the inner diameter of the thread D4.

In order to provide an elastic taper zone, the angles α and β can be adapted to one another in technical respects relating to manufacture. The pin diameter D1 is greater than the diameter D3 of the taper of the locking block bore (FIG. 4). When the screw 4 is inserted, the taper 7 of the locking block is elastically displaced at the rounded pin head 8 of the screw and springs elastically into the annular groove 6 with continued screwing (FIG. 2). If the screw is removed for assembly purposes, the elastic taper of the locking block is displaced in exactly the opposite manner and accordingly retains its functioning capability.

When screwed in, the screw is axially secured in that the taper 7 springs elastically into the annular groove 6 of the screw pin 5. The connection protects the screw from the rotational loosening forces acting on it with respect to function in the axial direction. The screw can be unscrewed again only manually and, accordingly, full protection against loosening of the screw is achieved in this use variant.

What is claimed is:

1. A spectacle mount with a locking block screw connection, comprising:

two locking blocks having a bore extending through said blocks, said bore having an inner wall peripherally bounding the bore and defining a first diameter bore portion and a second reduced diameter bore portion connected by a circular taper; and a screw for inserted receipt in said bore to connect said blocks and having a threaded region and a pin continuation at one end of the screw following said threaded region, said pin continuation defining an annular groove for engagement with said reduced diameter portion of the bore to provide a locked connection of said blocks by passage of the pin continuation, as the screw is inserted into said bore, along and beyond said circular taper to elastically deform said taper until the annular groove engages said reduced diameter portion to thereby provide the locked connection of the blocks.

2. A spectacle mount in accordance with claim 1, wherein said threaded region has a diameter larger than a diameter of the pin connection, and said annular groove has a diameter smaller than said second diameter of the bore.

3. A spectacle mount in accordance with claim 1, wherein said pin continuation further comprises a head carried on said one end of the screw and extending readially outward from said annular groove.

4. A spectacle mount in accordance with claim 2, wherein said pin continuation further comprises a head carried on said one end of the screw and extending readially outward from said annular groove.

5. A spectacle mount with a locking block screw connection, comprising:

two locking blocks having a bore extending through said blocks, said bore having an inner wall peripherally bounding the bore and defining a first diameter bore portion and a second reduced diameter bore portion connected by a circular taper; and a screw for inserted receipt in said bore to connect said blocks and have a non-threaded region and a pin continuation at one end of the screw following said non-threaded region, said pin continuation defining an annular groove for engagement with said reduced diameter portion of the bore to provide a locked connection of said blocks by passage of the pin connection, as the screw is inserted into said bore, along and beyond said circular taper to elastically deform said taper until the annular groove engages said reduced diameter portion to thereby provide the locked connection of the blocks.

* * * * *